United States Patent
Swain et al.

[11] Patent Number: 5,562,840
[45] Date of Patent: Oct. 8, 1996

[54] SUBSTRATE RECLAIM METHOD

[75] Inventors: Eugene A. Swain, Webster; Peter J. Schmitt, Ontario; Alfred O. Klein, Rochester; John J. Wilbert, Macedon, all of N.Y.

[73] Assignee: Xerox Corporation, Stamford, Conn.

[21] Appl. No.: 376,884

[22] Filed: Jan. 23, 1995

[51] Int. Cl.$^6$ .......................................... B08B 5/00
[52] U.S. Cl. .................. 216/65; 216/75; 216/58; 219/121.69
[58] Field of Search .................... 216/65, 58, 76, 216/74; 219/121.69

[56] References Cited

U.S. PATENT DOCUMENTS

| | | | |
|---|---|---|---|
| 4,671,848 | 6/1987 | Miller et al. | 156/643 |
| 4,841,611 | 6/1989 | Kusaba et al. | 29/121.2 |
| 4,877,644 | 10/1989 | Wu et al. | 427/53.1 |
| 4,947,023 | 8/1990 | Minamida et al. | 219/121.68 |
| 4,972,061 | 11/1990 | Duley et al. | 219/121.66 |
| 5,091,278 | 2/1992 | Teuscher et al. | 430/58 |
| 5,120,628 | 6/1992 | Mammino et al. | 430/59 |
| 5,164,567 | 11/1992 | Gettemy | 219/121.72 |
| 5,167,987 | 12/1992 | Yu | 427/171 |
| 5,324,608 | 6/1994 | Gerriets et al. | 430/60 |
| 5,378,315 | 1/1995 | Hendrix et al. | 216/92 |

FOREIGN PATENT DOCUMENTS

| 3144458 | 6/1991 | Japan . |
|---|---|---|
| 034934 | 5/1993 | Japan . |

Primary Examiner—Thi Dang
Attorney, Agent, or Firm—Zosan S. Soong

[57] ABSTRACT

There is disclosed a substrate reclaim method comprising directing laser energy at a coating covering a part of an outer surface of a substrate, wherein the outer surface has a shiny finish, thereby removing with the laser energy all of the coating on the outer surface and etching with the laser energy a portion of the outer surface to change the etched outer surface portion from a shiny finish to a matte finish.

13 Claims, 5 Drawing Sheets

SUBSTRATE RECLAIM METHOD

This invention relates generally to a method to recycle the substrate of a coated member such as a photoreceptor. More particularly, the invention relates to a method to reclaim the substrate of a photoreceptor by using laser energy to remove the entire coating and to etch a matte finish on the substrate's outer surface.

Conventional techniques to remove coatings are problematic. For example, mechanical techniques for removing coatings using for instance abrasive materials are cumbersome, inefficient, and may result in substrates of unacceptable quality. A solvent also may be employed to remove the coating from a photoreceptor. The initial cost of the solvent and the cost of solvent recovery can be very high. Moreover, where the coating may contain different layers of different materials, different solvents may be required to remove different layers. This adds to the complexity of removal of photoconductive coatings with the aid of a solvent because each layer has to be separately treated with different solvent. Furthermore, organic solvents have a limited useful life and can be hazardous to work with. Also, solvent emissions and the disposal of waste solvent may pose environmental problems. There is a need for a substrate reclaim method which avoids the use of a solvent, minimizes the need for subsequent steps to render the substrate surface suitable for recoating, and/or minimizes damage to the substrate.

Japanese Publication No. 3-144,458 discloses a process that attempts to remove coatings from the ends of a photoreceptor without mechanical or chemical treatment. A laser beam from an yttrium-aluminum-garnet laser is irradiated at the end portions of a photoreceptor drum to burn or sublimate the photoreceptor coating.

Japanese Publication No. 3-194,131 discloses a similar process in which laser energy is directed at the ends of a photoreceptor in an effort to completely remove the coating.

Minamida et al., U.S. Pat. No. 4,947,023, discloses a method and apparatus for roll dulling by pulse laser beam.

Kusaba et al., U.S. Pat. No. 4,841,611, discloses a work roll with a dulled surface having geometrically patterned uneven dulled sections for temper rolling.

Gerriets et al., U.S. Pat. No. 5,324,608, discloses the etching of a portion of a surface of a metal drum, having an anodized layer, with a laser beam to substantially remove the anodized layer.

Wu et al., U.S. Pat. No. 4,877,644 discloses the selective plating by laser ablation.

Miller et al., U.S. Pat. No. 4,671,848, discloses a method for laser-induced removal of a surface coating.

Gettemy, U.S. Pat. No. 5,164,567, discloses a method of cutting with a laser beam where an oxygen-hydrocarbon reaction is used to provide auxiliary energy to a metal workpiece to supplement the energy supplied by the laser. Oxygen is supplied to the laser focus point on the workpiece by a nozzle through which the laser beam also passes.

Copending patent application U.S. Ser. No. 08/071,087 (Attorney Docket No. D/89426), filed Jun. 4, 1993, which is totally incorporated by reference, discloses a process for treating a predetermined portion of a coating on a photoreceptor to remove at least part of the coating. The process involves directing a source of high energy irradiation at the coating in the presence of at least one fluid medium to remove at least part of the coating from the predetermined portion of the coating. The source of high energy irradiation is preferably a laser beam, ultrasonic energy, or a source of high intensity heat. The fluid medium is preferably at least one gas jet, liquid jet or a liquid solvent. There are disclosed a fluid coaxial jet and a fluid cross-jet.

Copending patent application U.S. Ser. No. 08/222,159 (Attorney Docket No. D/94035), filed Apr. 1, 1994, discloses a capture system employing an annular fluid stream suitable for use in laser ablation of a photoreceptor. There is disclosed on page 8 the removal of the coating along the entire length of the photoreceptor.

SUMMARY OF THE INVENTION

It is an object in embodiments of the present invention to provide a substrate reclaim method which avoids the use of a solvent, minimizes the need for subsequent steps to render the substrate surface suitable for recoating, and/or minimizes damage to the substrate.

These objects and others are accomplished in embodiments by providing a substrate reclaim method comprising directing laser energy at a coating covering a part of an outer surface of a substrate, wherein the outer surface has a shiny finish, thereby removing with the laser energy all of the coating on the outer surface and etching with the laser energy a portion of the outer surface to change the etched outer surface portion from a shiny finish to a matte finish.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in the Figures refers to the same or similar feature.

DETAILED DESCRIPTION

The invention relates to a method for removing all of the coating from a coated substrate such as a photoreceptor. The coating on a photoreceptor is removed by directing high energy radiation such as a laser beam and optionally one or more fluid jets at the coating. The removal using laser energy of coating material, optionally with the assistance of a fluid stream, will be referred to as "laser ablation." The laser ablation process functions to effectively remove the coating without the need for chemical or mechanical treatments. The process is useful for reclaiming cylindrical photoreceptor drums.

Figure 1:
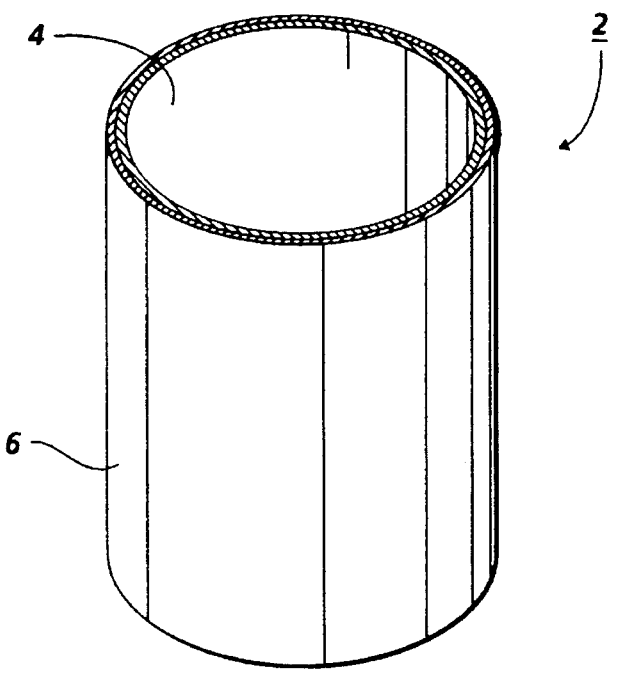
FIG. 1 shows a cylindrical photoreceptor having an outer coating to be treated according to one embodiment of the invention.

For purposes of illustration, the process according to the invention will be described with reference to the treatment of a coated cylindrical photoreceptor. Referring to FIG. 1, a partially processed photoconductor drum 2 is shown. Drum 2 includes a rigid cylindrical substrate 4 having an outer coating 6 formed over the substrate. Substrate 4 can be made of any suitable material such as aluminum, nickel, zinc, chromium, conductive paper, stainless steel, cadmium, titanium, metal oxides, polyesters such as MYLAR®, and the like. Substrate 4 can be formed as one layer or as a plurality of layers, for example as a conductive layer coated over an insulating layer. The thickness of substrate 4 can vary widely depending on the intended use of the photoreceptor, and preferably is from about 25 micrometers to about 5 millimeters thick, most preferably from about 0.05 millimeter to about 2 millimeters thick.

The process removes various types of known photoreceptor coatings. Coating 6 can include one or a plurality of layers, and typically will include multiple layers such as an electrically conductive ground plane, a blocking layer such as an anodized layer of for example aluminum oxide, an adhesive layer, a charge generating (photogenerating) layer, a charge transporting layer and an overcoat layer. The process preferably removes all the layers of the coating along the entire length of the photoreceptor.

The layers of coating 6 are formed using well known techniques and materials. For example, coating 6 can be applied to substrate 4 by vacuum deposition, immersion, spray coating, or dip coating. Dip coating or spray coating are preferred. Suitable coating techniques and materials are illustrated in U.S. Pat. Nos. 5,091,278, 5,167,987 and 5,120,628, the entire disclosures of which are totally incorporated herein by reference. The coating 6 may have a thickness ranging for example from about 10 to about 100 microns, preferably from about 20 to about 60 microns.

Coating 6 preferably includes, as a photoconductive material, one or a plurality of layers of selenium, metal alloys, and/or organic resins carrying photoconductive materials. Organic photoconductor coatings are preferred. Such coatings include a photoconductive material such as pigments including dibromoanthanthrone, metal-free and metal phthalocyanines, halogenated metal phthalocyanines, perylenes, and azo pigments, carried in a suitable organic binder resin. Examples of useful organic binder resins include polycarbonates, acrylate polymers, vinyl polymers, cellulose polymers, polysiloxanes, polyamides, polyurethanes, polyesters, and block, random or alternating copolymers thereof.

Figure 2:
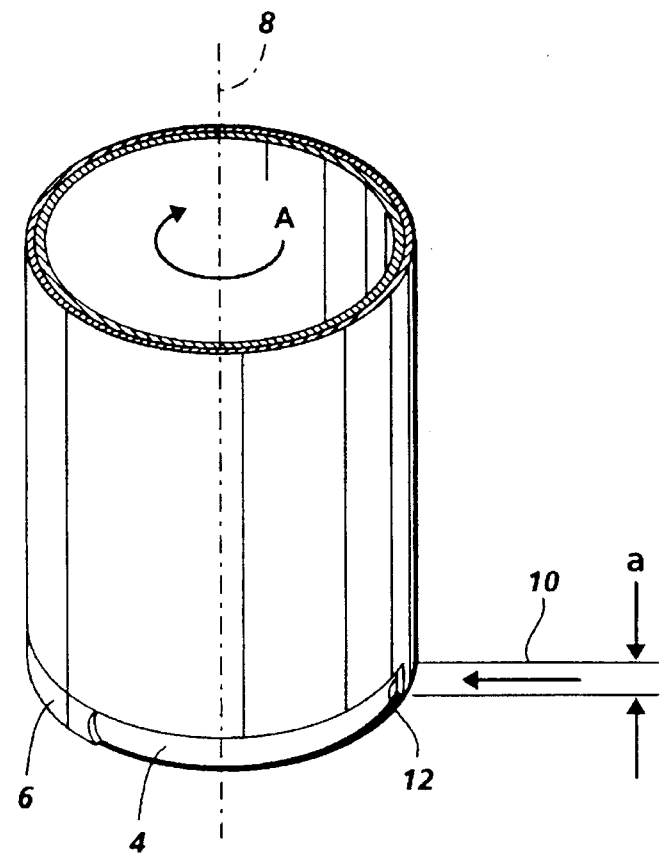
FIG. 2 illustrates the removal of a portion of the coating using laser radiation according to one embodiment of the invention.

Referring to FIG. 2, substrate or drum 2 is mounted such that its longitudinal axis 8 is vertically or horizontally oriented. Drum 2 is preferably mounted using a conventional chucking device coupled to a drive (not shown), so that drum 2 can be rotatably driven about longitudinal axis 8 in the direction of arrow A. The photoreceptor is preferably rotated about axis 8 during the removal of the coating. A rotational speed of from about 400 rpm to about 4000 rpm is preferred.

As drum 2 is rotated, a laser beam 10 of width "a" from a conventional $CO_2$ laser (not shown) is directed at a predetermined portion of coating 6. The width "a" of the laser beam may range for example from about 0.0010 to about 0.030 mm. The laser used in the process is preferably a continuous wave carbon dioxide laser. $CO_2$ lasers provide a laser beam having a wavelength that is particularly well absorbed by plastic binder resins commonly present in one or more layers of known photoreceptors. A $CO_2$ laser emitting a beam at a wavelength of about 10.6 micrometers has been found to work well for organic photoconductor films having polycarbonate binders. Carbon dioxide continuous wave lasers are commercially available and require no special modification to be effective in carrying out the ablation. Alternately, among others, a pulsed beam $CO_2$ laser, yttrium aluminum garnet (YAG) laser, or excimer laser could be used to carry out the laser ablation process.

The laser should have sufficient power to remove a desired amount of the particular coating to be treated. The power of the $CO_2$ laser should be selected depending on the type of substrate present in the photoreceptor. Where the photoreceptor includes an aluminum substrate, a laser having a power of from about 100W to about 2000W, more preferably from about 1000W to about 2000W, has been found to provide preferred results. With a nickel substrate, a laser having a power of from about 100W to about 400W is preferred.

The laser beam should have a sufficient watt density to ablate the photoreceptor coating. An optical system is preferably used to concentrate the laser beam and provide the required watt density for a particular photoreceptor coating. However, laser beam systems are available that may not require an optical system to provide a laser beam having a sufficient watt density to ablate a photoreceptor coating. The focal length, focus, and angle of incidence of the laser affect the laser ablation process, and can be selected depending on the particular coating and the results intended. A focal length of about 5 inches and a surface focus or slightly off-surface focus are preferred. Most preferably, the laser has a focus tolerance of about ±0.75 mm from the point of sharp focus, in either direction.

At a given moment during laser ablation, laser beam 10 impinges on a spot 12 such that at least part of the coating material in the area of spot 12 is rapidly heated and vaporized by laser beam 10. Part of coating 6 is typically melted by laser beam 10; this molten coating material is forced off of drum 2 by the action of an optional cross-jet fluid.

One fluid jet which may be used in the ablation process is a cross-jet of fluid. Another optional fluid jet used with the ablation process is coaxial with the laser beam. A combination of the two is preferred for laser ablation. Conventional apparatus for supplying cross and coaxial fluid jets, which are commercially available, may be employed in embodiments of the instant invention. The laser vaporizes and removes the coating as it traverses across the substrate surface. In embodiments, the laser may melt but not vaporize certain other materials in the coating. By applying a high velocity stream of cross-jet fluid to the coating during laser treatment, the molten coating material is forced off the photoreceptor in a controlled manner. This may permit all of the coating material to be removed from the substrate surface without subsequent chemical or mechanical treatment. The cross-jet gas preferably has a pressure of from about 20 psi to about 400 psi, more preferably from about 100 psi to about 300 psi.

The supplying of a coaxial fluid jet around the laser beam during laser treatment prevents debris from backing up into the laser optics during the ablation process. The coaxial fluid jet travels around the outside of the laser beam in the same direction as the beam. This protects the laser and increases the online production time of the laser ablation system. A coaxial gas jet preferably has a pressure in the range of from about 5 psi to about 150 psi, more preferably from about 20 psi to about 80 psi, measured near the point at which the gas exits from the jet nozzle. It will be understood that the pressure of the gas can be varied by controlling the nozzle orifice size and the speed of the gas exiting the gas jet nozzle. A suitable nozzle diameter is about 1.5 mm, but various diameters are useful. Preferably, the process uses both cross and coaxial gas jets.

The gas used in the cross-jet and/or coaxial jet may be air, but can be other gases such as nitrogen gas or pure oxygen gas, depending on the coating material and other laser ablation conditions. For example, if a highly reactive or potentially explosive coating is to be removed, an inert cross-jet or coaxial jet gas such as nitrogen gas can be used. Conversely, if additional oxidation of the coating during the laser ablation process is desired, pure oxygen gas or other reactive gas mixtures can be used.

In an alternative embodiment, a liquid cross-jet could be used to assist the removal of the ablated photoreceptor coating. The liquid jet should have an orientation and pressure sufficient to impart about the same pressure on the ablated coating as the cross-jet gas described above.

As drum 2 rotates during the laser ablation process, a circumferential strip of coating material 6 substantially the same width as the width "a" of the laser beam is removed, exposing the underlying cylindrical photoreceptor substrate 4. The laser and optional gas jets are directed at the predetermined portion of coating 6 until the coating has been removed.

The laser source is mounted on a carriage (not shown) so as to be reciprocatable parallel to axis 8 during rotation of drum 2. Laser beam 10 and the optional fluid jets can be translated from one end of drum 2 toward the other end. The coaxial fluid jet, if used, moves with the laser beam as the beam is translated over the photoreceptor coating. The cross-jet of fluid, if used, can be moved with the laser beam, or it can be maintained in a stationary position. The fluid jets are preferably directed at the photoreceptor to push the ablated coating off the end of the photoreceptor during the treatment. This helps prevent the ablated coating material from resettling on the untreated portion of the coating. A suction exhaust system (not shown) is preferably used to help capture the particulate debris and remove it from the treatment area.

The translation speed of laser beam 10 preferably is from about 0.25 millimeter per second to about 12.5 millimeters per second. A single pass over the coating is preferred. However, laser beam 10 can be translated across portions of coating 6 more than once if needed to remove coating material not removed by the first pass of the laser beam.

Figure 3:
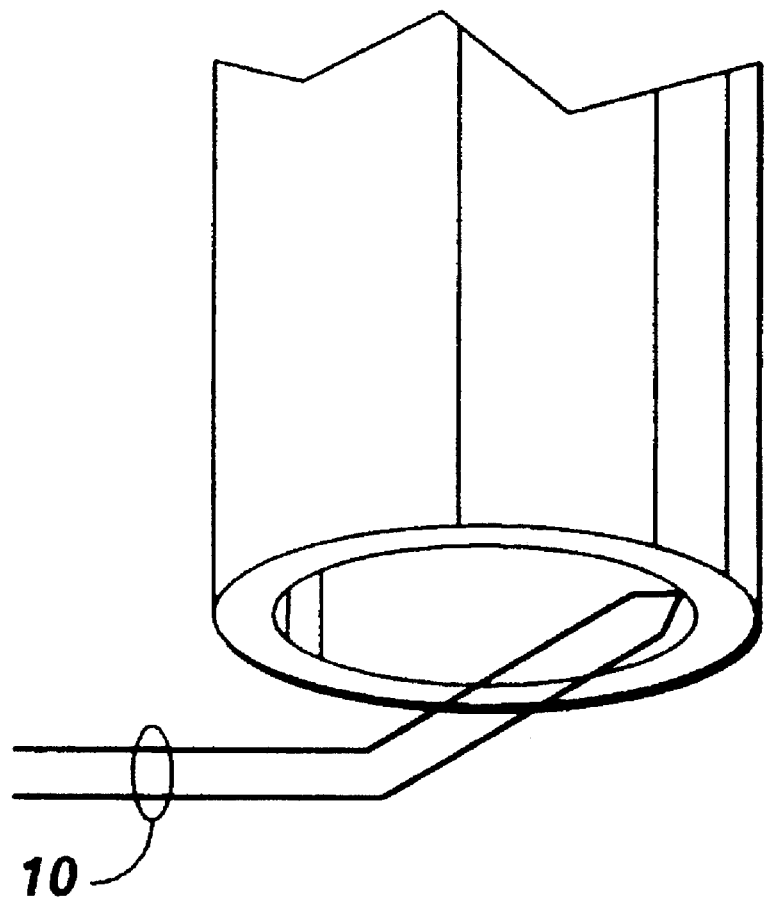
FIG. 3 is a partial plan view showing the removal of a coating from an inner portion of a cylindrical photoreceptor according to one embodiment of the invention.

In embodiments, when the coating 6 has been removed from the outer surface of substrate 4, the laser and fluid jets can be stopped and reoriented to impinge upon any selected portion of the inner surface of substrate 4. FIG. 3 is a partial plan view showing the removal of a coating by laser beam 10 from the inner surface of a cylindrical photoreceptor according to the laser ablation embodiment of the invention. After removal of the coating, the substrate 4 is removed from the chucking device for further processing.

Figure 4:
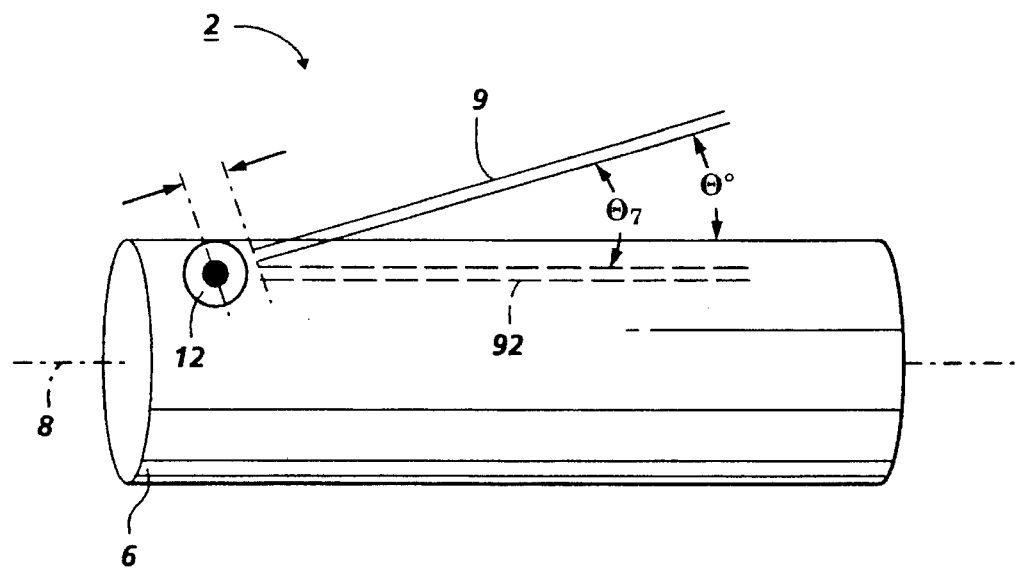
FIG. 4 shows a cross-jet for a fluid.

FIG. 4 shows a side view of drum 2 being laser ablated at spot 12 on coating 6. An optional high velocity cross-jet fluid 9 is directed at spot 12 to force molten coating material off the end of drum 2. As shown, cross-jet fluid 9 may be oriented at an angle $\theta_7$ from the outer surface of coating 6. The angle $\theta$ of orientation of cross-jet fluid 9 may range for example from about 0° to about 90° from the surface of coating 6, most preferably from about 15° to about 45°. The cross-jet fluid also has an angle $\theta_7$ associated with it, measured from the imaginary line 92 which represents the line on the surface of drum 2 which is parallel to the longitudinal axis 8 and which includes spot 12. This angle $\theta_7$ may range for example from about 15° to about 60°, preferably from about 30° to about 45°, and especially about 45°.

Figure 5:
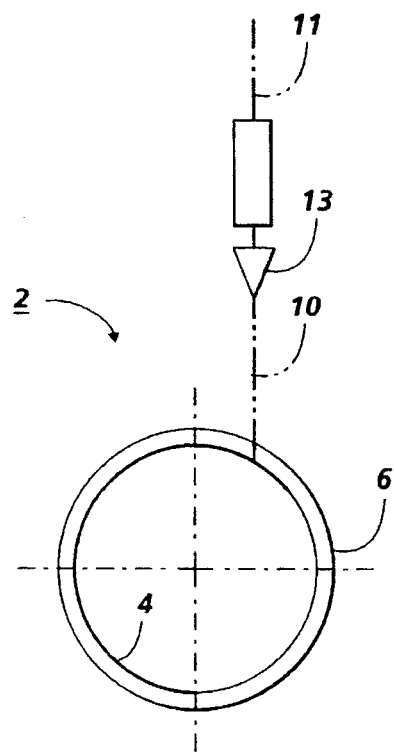
FIG. 5 illustrates a preferred orientation of laser ablation.

FIG. 5 illustrates a preferred laser orientation. Laser beam nozzle 13 is preferably oriented along axis 11 which is coincident with beam 10 such that laser beam 10 intersects both coating 6 and substrate 4. The laser beam can be directed at the coating at various angles to provide an adequate absorption of the laser energy by coating 6. Absorption of the laser energy by substrate 4 should be minimized. Also, the laser beam should not be directed along a diameter of photoreceptor 2 because this may cause the laser beam to reflect off of substrate 4 directly back into the laser, possibly damaging the laser.

Figure 6:
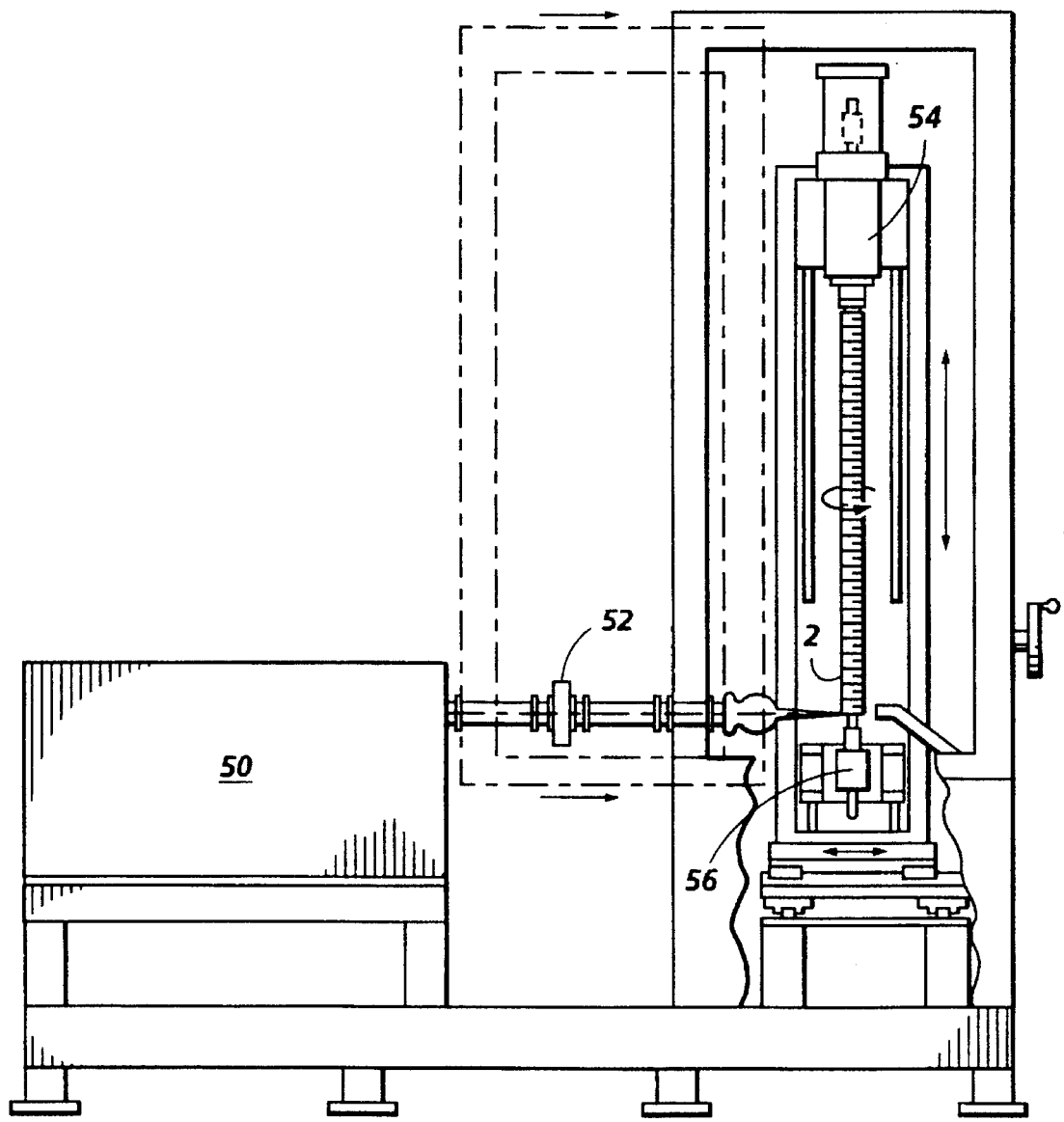
FIG. 6 is a side view of a laser system for removing a coating from a photoreceptor according to the laser ablation embodiment of the invention.
Figure 7:
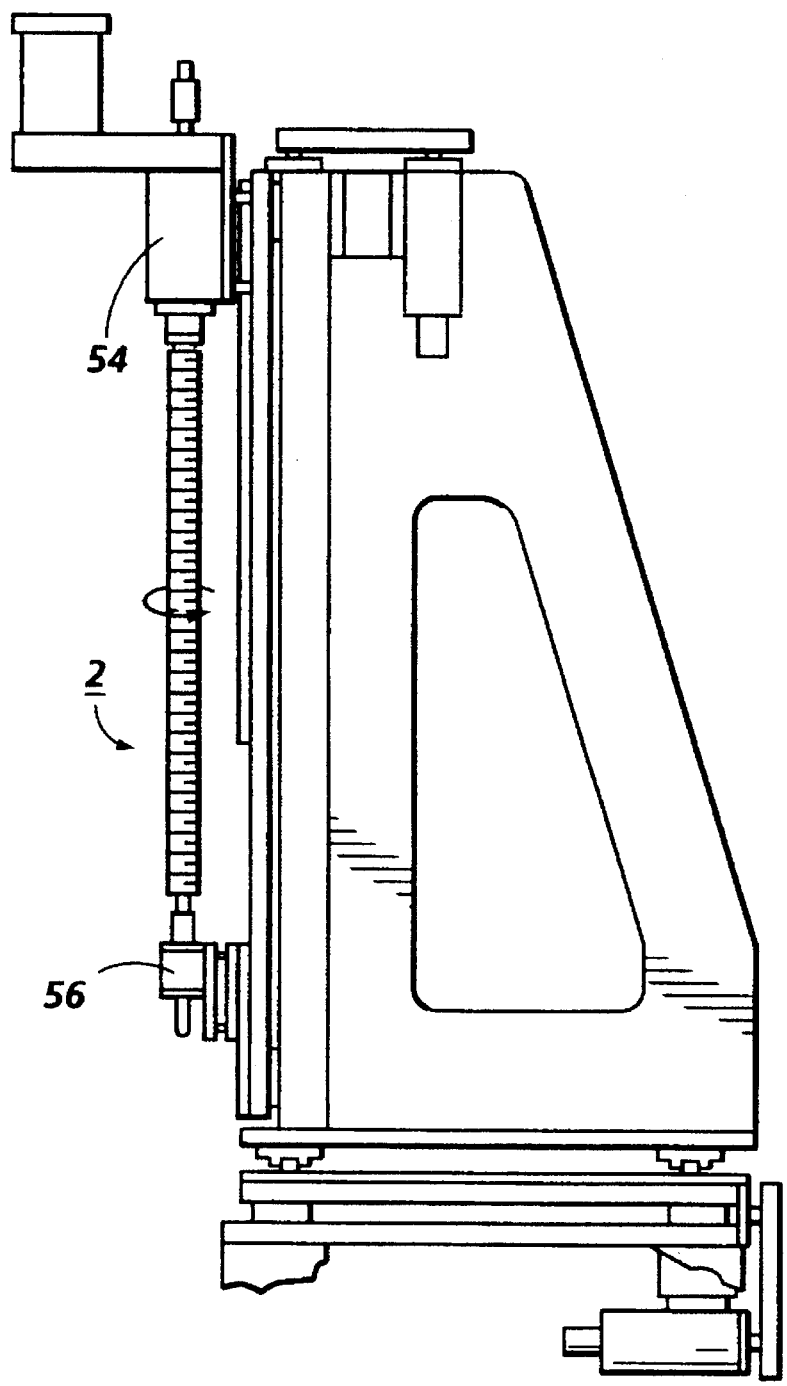
FIG. 7 is a side view of the laser system of FIG. 6.

FIG. 6 is a side view of a suitable laser system for removing a coating from a photoreceptor according to a laser ablation embodiment of the invention. Referring to FIG. 6, the apparatus includes a laser section 50 including a $CO_2$ continuous wave laser, an optical train 52 for directing and concentrating the laser beam, and a material handling section 54 for supporting and rotating photoreceptor 2. Material handling section 54 includes a removable tailstock 56, allowing the inner peripheral ends of photoreceptor 2 to be treated. FIG. 7 is a side view of the laser system of FIG. 6.

The laser ablation process removes all the coating layers as well as materials contained within the ablated coating, such as pigments, adhesives, solvents, binders, conductive particles of metal oxides, and the like. In embodiments, the process may obviate the need to further treat drum 2 with chemical solvents or mechanical cleaning means. The resulting outer surface of the substrate may be clean and undamaged, suitable for recoating for a second use as a photoreceptor. In embodiments of the instant invention, the outer surface of the substrate has a shiny, light reflective finish underneath the coating prior to exposure to the laser energy; the laser energy completely removes the coating and etches the outer surface of the substrate—changing it from a shiny, light reflective finish to a matte finish. The change in the surface finish from shiny to matte is believed to be caused by oxidation of the substrate, fabricated from for example aluminum, due to the extreme local heat caused by the burning of the coating in the presence of for instance pure oxygen. It is believed that prior laser ablation processes do not produce the matte finish (i.e., do not change the reflectivity of the surface) on for example an aluminum substrate because such prior processes preferably use air rather than oxygen for the fluid jets and the substrate rotates slower in the prior processes.

A matte finish on the substrate may be desired in embodiments because it may minimize or eliminate optical interference occurring within a photoconductive member which results in a defect that resembles the grain in a sheet of plywood in output prints derived from the exposed photoconductive member when the exposure is a uniform, intermediate-density gray. Thus, in embodiments, the laser energy changes the reflectivity of the substrate such as from a shiny finish to a matte finish. It is preferred that the change in reflectivity is towards a finish such as a matte type finish which minimizes optical interference occurring within a photoconductive member.

The shiny surface of the substrate prior to exposure to the laser energy may be defined by the following surface parameters: $R_a$ ranging for example from about 0.01 micron to about 0.07 micron; and $R_t$ ranging for example from about 0.1 micron to about 0.6 micron. The resulting matte finish may be defined by the following surface parameters: $R_a$ ranging for example from about 0.1 micron to about 1 micron, preferably from about 0.3 micron to about 0.6 micron; and $R_t$ ranging for example from less than about 10 microns, preferably from about 0.5 micron to about 6 microns, and especially from about 0.8 micron to about 4.5 microns. $R_a$ (mean roughness) is the arithmetic average of all departures of the roughness profile from the mean line within the evaluation length. $R_t$ (maximum roughness depth) is the vertical distance between the highest peak and the lowest valley of the roughness profile R within the evaluation length. In some instances, the $R_a$ and $R_t$ values of a matte surface and a shiny surface may be the same values or very similar values. This is the case because these measurements are not sufficient to fully characterize the optical surface properties of a substrate but are the accepted guidelines for electrophotography. The surface parameters, $R_a$ and $R_t$, may be determined by a 5 micron radius stylus used on a Perthometer Model #S8P available from Mahr Feinpruef Corporation.

In embodiments, the instant method further comprises supplying a stream of oxygen gas, preferably pure oxygen gas, to assist the removing the coating and the etching of the outer surface of the substrate. Preferably, the etching to create the matte finish is carried out on the entire outer surface of the substrate. The etching with the laser energy in embodiments may remove a portion of the substrate itself, thereby reducing the cross-sectional dimension of the substrate by an amount ranging for example from about 5 to about 150 microns, and preferably from about 20 to about 50 microns. The removal of the coating and the etching of the substrate surface may occur at the same or different laser power. The removal of the coating and the etching of the substrate surface may occur substantially simultaneously since it is believed that the burning of the coating produces the heat needed in order to etch the substrate surface.

Another coating comprised of one or more layers may be deposited on the reclaimed substrate, wherein the new coating has the same composition and thickness and is deposited using the same deposition methods as disclosed herein for coating 6. In embodiments, the substrate may be provided with an anodized layer such as of aluminum oxide. Preferably, the recoated substrate is a photoreceptor.

The invention will now be described in detail with respect to specific preferred embodiments thereof, it being understood that these examples are intended to be illustrative only and the invention is not intended to be limited to the materials, conditions or process parameters recited herein. All percentages and parts are by weight unless otherwise indicated. In the examples, the surface parameters are determined by a 5 micron radius stylus used on a Perthometer Model #S8P available from Mahr Feinpruef Corporation.

EXAMPLE 1

A photoreceptor comprising an aluminum substrate and a coating is selected. The substrate is a hollow aluminum cylinder with the following dimensions: an outer diameter of about 40 mm, a length of about 31.8 cm, and a wall thickness of about 1 mm. The substrate has a shiny, reflective finish on its outer surface having the following surface parameters: $R_a$ is 0.05 micron; and $R_t$ is 0.5 micron. The three layer coating comprises a nylon blocking layer of about 1 micron in thickness, a photogenerating layer of metal free phthalocyanine dispersed in a plastic binder of about 2 microns in thickness, and a charge transporting layer of polycarbonate film forming binder containing a dissolved aryl amine having a thickness of about 18 microns.

A continuous wave carbon dioxide laser (model name Vulcan manufactured by Coherant General Corporation of Sturbridge, Massachusetts) is used to remove the entire coating on the outer surface of the substrate along the the entire substrate length. The laser also etches the substrate surface to change the shiny finish to a matte finish. The laser provides a laser beam having a diameter of 0.15 mm after focusing. The laser's focus latitude is about ±0.75 mm from the point of sharp focus. The photoreceptor is mounted in a chucking device and rotated. The exhausting system employs a vacuum having a pressure of 2.54 cm mercury. The operating parameters are as follows:
substrate rotation speed (counterclock wise): 600 rpm;
laser power: 1,000 watts;
laser beam traverse speed: 3 inches (7.6 cm)/minute;
co-axial jet (pure oxygen gas): 80 psi (5.6 kg per cm$^2$);
cross-jet (air): 100 psi (7 kg per cm$^2$);
cross-jet angle: 0 to axis;
axial offset for laser: 0.550 inch (1.4 cm); and
laser nozzle distance to photoreceptor: 0.012 inch (0.3 mm).

The laser beam completes only one pass along the photoreceptor.

The resulting aluminum substrate surface is clean and undamaged, suitable for recoating for a second use. The substrate surface also has a matte finish with the following surface characteristics: $R_a$ is 0.65 micron; and $R_t$ is 9.4 microns.

EXAMPLE 2

A photoreceptor comprising an aluminum substrate and a coating is selected. The substrate is a hollow aluminum cylinder with the following dimensions: an outer diameter of about 40 mm, a length of about 31.8 cm, and a wall thickness of about 1 mm. The substrate has a shiny, reflective finish on its outer surface characterized by the following surface roughness parameters: $R_a$ is 0.15 micron; and $R_t$ is 1.5 micron. The blocking layer coating comprises an anodized layer of aluminum oxide having a thickness of about 10 microns adjacent the substrate surface. The two layer organic coating comprises a photogenerating layer of metal free phthalocyanine dispersed in a plastic binder of about 2 microns in thickness and a charge transporting layer of polycarbonate film forming binder containing a dissolved aryl amine having a thickness of about 18 microns.

A continuous wave carbon dioxide laser (Model No. 1700 manufactured by Rofin-Sinar Corporation, Plymouth, Mich.) is used to remove the entire coating on the outer surface of the substrate along the the entire substrate length except for the anodized layer. The laser provides a laser beam having a diameter of 0.15 mm after focusing. The laser's focus latitude is about ±0.75 mm from the point of sharp focus. The photoreceptor is mounted in a chucking device and rotated. The exhausting system employs a vacuum having a pressure of 2.54 cm mercury.
The operating parameters are as follows:
substrate rotation speed (counterclock wise): 3,000 rpm;
laser power: 100 watts;
laser beam traverse speed: 11 inches (28 cm)/minute;
cross-jet (air): 300 psi (21.1 kg per cm$^2$);
cross-jet angle: 0 to axis;
axial offset for laser: 0.710 inch (1.8 cm); and
laser nozzle distance to photoreceptor: 0.012 inch (0.3 mm).

The laser beam completes only one pass along the photoreceptor.

The resulting anodized aluminum substrate surface is clean and undamaged, suitable for recoating for a second use. The anodized layer provides the substrate surface with a matte finish with the following surface characteristics: $R_a$ is 0.15 micron; and $R_t$ is 1.5 microns.

EXAMPLE 3

A photoreceptor having the same configuration, dimensions, and composition as in Example 2 is selected.

A continuous wave carbon dioxide laser (Model No. 1700 manufactured by Rofin-Sinar Corporation, Plymouth, Mich.) is used to remove the entire coating, including the anodized layer of aluminum oxide, on the outer surface of the substrate along the the entire substrate length. The laser also etches the substrate surface to change the shiny finish to a matte finish. The laser provides a laser beam having a diameter of 0.15 mm after focusing. The laser's focus latitude is about ±0.75 mm from the point of sharp focus. The photoreceptor is mounted in a chucking device and rotated. The exhausting system employs a vacuum having a pressure of 2.54 cm mercury. The operating parameters are as follows:

substrate rotation speed (counterclock wise): 4,000 rpm;
laser power: 250 watts;
laser beam traverse speed: 11 inches (28 cm)/minute;
cross-jet (air): 100 psi (7 kg per cm$^2$);
cross-jet angle: 0 to axis;
axial offset for laser: 0.550 inch (1.4 cm); and
laser nozzle distance to photoreceptor: 0.012 inch (0.3 mm).

The laser beam completes only one pass along the photoreceptor.

The resulting aluminum substrate surface is clean and undamaged, suitable for recoating for a second use. The substrate surface also has a matte finish with the following surface characteristics: $R_a$ is 0.8 micron; and $R_t$ is 6.5 microns.

Other modifications of the present invention may occur to those skilled in the art based upon a reading of the present disclosure and these modifications are intended to be included within the scope of the present invention.

We claim:

1. A substrate reclaim method comprising directing laser energy at a coating covering a part of an outer surface of a substrate to melt or vaporize the coating, wherein the outer surface has a shiny finish, thereby removing with the laser energy all of the coating on the outer surface and etching with the laser energy a portion of the outer surface to change the etched outer surface portion from a shiny finish to a matte finish, wherein the removing of the coating and the etching of the portion of the outer surface are accomplished substantially simultaneously.

2. The method of claim 1, wherein the substrate is aluminum.

3. The method of claim 1, wherein the coating is an anodized layer.

4. The method of claim 1, wherein the coating comprises a photoconductive material.

5. The method of claim 1, wherein the coating comprises a photoconductive layer and an anodized layer.

6. The method of claim 1, further comprising supplying a stream of oxygen gas to assist the removing the coating and the etching of the portion of the outer surface.

7. The method of claim 1, wherein the laser energy is generated from a carbon dioxide laser.

8. The method of claim 1, wherein the substrate is a hollow cylinder and the etching is carried out on the entire outer surface.

9. The method of claim 1, wherein the etching removes a portion of the substrate, thereby reducing the cross-sectional dimension of the substrate by an amount ranging from about 5 to about 150 microns.

10. The method of claim 1, wherein the removing of the coating and the etching of the portion of the outer surface occur at the same laser power.

11. The method of claim 1, wherein the removing of the coating and the etching of the portion of the outer surface occur at a different laser power.

12. The method of claim 1, further comprising depositing a second coating on the etched outer surface portion.

13. The method of claim 1, wherein the removing of all of the coating on the outer surface and the etching of the portion of the outer surface are accomplished in a single pass of the laser beam along the substrate length.

* * * * *